(12) United States Patent
Oi et al.

(10) Patent No.: US 6,420,506 B1
(45) Date of Patent: Jul. 16, 2002

(54) α-OLEFIN-BASED COPOLYMER, PROCESS FOR THE PRODUCTION THEREOF, AND MOLDED ARTICLE COMPRISING THE SAME

(75) Inventors: Nobuo Oi, Narashino; Yuki Iseki, Sodegaura; Yasuro Suzuki, Kisarazu, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/517,265

(22) Filed: Mar. 2, 2000

(30) Foreign Application Priority Data

Mar. 4, 1999 (JP) ............................................ 11-056982

(51) Int. Cl.[7] ............................ C08F 212/06; C08F 4/16
(52) U.S. Cl. ........................ 526/347; 526/160; 526/161; 526/336; 526/916; 526/943; 502/155
(58) Field of Search ................................. 526/160, 161, 526/943, 346, 347, 916, 335, 336, 280, 281

(56) References Cited

U.S. PATENT DOCUMENTS 4,985,495 A * 1/1991 Nishio et al. ................. 525/68
6,187,889 B1 * 2/2001 Oi et al. ...................... 526/347

FOREIGN PATENT DOCUMENTS

| EP | 416815 | | 3/1991 |
| EP | 0 718 323 A2 | * | 6/1996 |
| EP | 718323 | | 6/1996 |
| EP | 842939 | | 5/1998 |
| EP | 0872492 A | | 10/1998 |
| EP | 0 893 245 A1 | * | 1/1999 |
| EP | 893245 | | 1/1999 |
| EP | 0 911 346 A2 | * | 4/1999 |
| EP | 911346 | | 4/1999 |
| GB | 1071038 | * | 6/1967 |
| JP | 60026011 A | | 8/1985 |
| JP | 04318006 A | | 11/1992 |
| JP | 08269134 A | | 10/1996 |
| WO | WO9809999 | | 3/1998 |

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

An α-olefin-alkenyl aromatic hydrocarbon-diene copolymer, a process for producing the copolymer, which comprises copolymerizing an α-olefin, a mono-alkenyl aromatic hydrocarbon and a diene in the presence of a specific catalyst, and a molded article comprising the copolymer.

8 Claims, No Drawings

α-OLEFIN-BASED COPOLYMER, PROCESS FOR THE PRODUCTION THEREOF, AND MOLDED ARTICLE COMPRISING THE SAME

BACKGROUND OF THE INVENTION

1. Field of the Invention

The present invention relates to a copolymer suitable for a stretch film, a shrink film and a wrap film, a process for the production thereof, and a molded article comprising the same.

2. Description of the Related Arts

In general, an elastic recoverability, a transparency and a mechanical strength found in a polyvinyl chloride are required for a copolymer to be used as various films such as a stretch film, a shrink film, a wrap film and the like. However, the polyvinyl chloride comes in question concerning environmental pollution because of the possibility of generation of harmful substances at incineration, etc. Various kinds of polymers are presently considered as a replacement for the polyvinyl chloride, but it is the status quo that none of them have been obtained that are satisfactory from the viewpoints of viscoelastic properties and transparency.

Since copolymerization of an α-olefin represented by propylene with an alkenyl aromatic hydrocarbon represented by styrene was carried out using a Solvay type titanium trichloride catalyst, studies using various solid catalysts have been carried out. For example, polymerization processes which use a solid catalyst prepared by using titanium tetrachloride and an electron donor are disclosed in Japanese Patent Publication (Kokai) Nos.60-26011 and 4-318006. However, in both of those processes, the polymerization activity is low and a homopolymer is formed as a by-product. Further, the obtained copolymer has a low amount of copolymerized styrene and a crystallinity, and is not adequate from the viewpoints of elastic recoverability, flexibility and transparency.

Japanese Patent Publication (Kokai) No.8-269134 discloses a process for producing a copolymer of propylene with styrene which has syndiotactic propylene sequences using a so-called homogeneous Ziegler-Natta catalyst which uses a specific transition metal compound and an organoaluminum compound. However, the copolymer obtained by the process, has also a low styrene content and a crystallinity, and is insufficient from the viewpoints of elastic recoverability, flexibility and transparency.

Further, because such copolymer has a tendency of which the molecular weight of the copolymer becomes lower with the increase of the styrene content, there is a problem that the copolymer of high styrene content is insufficient in mechanical strength.

SUMMARY OF THE INVENTION

The present invention was accomplished in view of the above-situations. Namely, the object of the present invention is to provide a copolymer of an α-olefin, a mono-alkenyl aromatic hydrocarbon (herein-after, sometimes referred to simply as "alkenyl aromatic hydrocarbon") and a diene, having an excellent elastic recoverability and flexibility, and being capable of taking a constitution in which a halogen is not contained.

Another object of the present invention is to provide a process for producing said copolymer at an extremely high polymerization activity.

Other objects of the present invention are to provide a molded article comprising said copolymer and being excellent in elastic recoverability, flexibility and mechanical strength, and the like.

In order to accomplish the objects described above, the present inventors have extensively studied regarding a copolymer of an α-olefin, an alkenyl aromatic hydrocarbon and a diene based on a producing method using a transition metal compound represented by a metallocene as a catalyst component, and as the result, the present inventors have attained the present invention.

Namely, the present invention relates to a copolymer of an α-olefin, an alkenyl aromatic hydrocarbon and a diene. Further, the present invention relates to a process for producing the fore-mentioned copolymer, which comprises copolymerizing an α-olefin, a mono-alkenyl aromatic hydrocarbon and a diene in the presence of a catalyst prepared by using (A) and (B), (A) and (C), or (A), (B) and (C) described below, and a molded article comprising the copolymer.

(A): a transition metal complex represented by the following general formula [I], [II] or [III]:

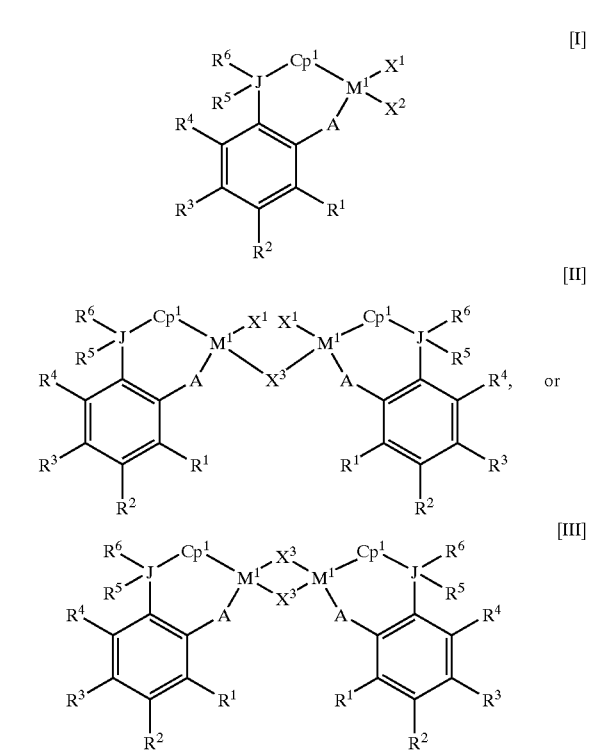

wherein $M^1$ indicates a transition metal atom of the Group IV of the Periodic Table of the Elements, A indicates an atom of the Group XVI of the Periodic Table of the Elements, J indicates an atom of the Group XIV of the Periodic Table of the Elements, $Cp^1$ indicates a group having a cyclopentadiene type anion skeleton, each of $X^1$, $X^2$, $R^1$, $R^2$, $R^3$, $R^4$, $R^5$ and $R^6$ independently indicates a hydrogen atom, a halogen atom, an alkyl group, an aralkyl group, an aryl group, a substituted silyl group, an alkoxy group, an aralkyloxy group, an aryloxy group or a di-substituted amino group, $X^3$ indicates an atom of Group XVI of the Periodic Table of the Elements, $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$, $R^1$, $R^2$, $R^3$, $R^4$, $R^5$ and $R^6$ may be respectively the same or different;

(B) one or more aluminum compounds selected from the following (B1) to (B3);

(B1) an organoaluminum compound represented by the general formula $E^1_aAlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_cAlE^3_2$, wherein $E^1$, $E^2$ and $E^3$ respectively represent a hydrocarbon group, all of $E^1$, all of $E^2$ and all of $E^3$ may be the same or different, Z represents a hydrogen atom or a halogen atom, and all of Z may be the same or different, "a" represents a number satisfying the expression $0<a \leq 3$, "b" represents an integer of 2 or more and "c" represents an integer of 1 or more; and (C) a boron compound of any one of the following (C1) to (C3):

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$, wherein B represents a boron atom in the trivalent valence state, $Q^1$ to $Q^4$ may be the same or different and respectively represent a halogen atom, a hydrocarbon group, a halogenated hydrocarbon group, a substituted silyl group, an alkoxy group or a di-substituted amino group, $G^+$ represents an inorganic or organic cation, L represents a neutral Lewis base, and $(L-H)^+$ represents a Brønsted acid.

DETAILED DESCRIPTION OF THE INVENTION

The present invention is further illustrated in detail below.

The copolymer of an α-olefin, a mono-alkenyl aromatic hydrocarbon and a diene in the present invention is a copolymer containing repeating units derived from the α-olefin and repeating units derived from the alkenyl aromatic compound and repeating units derived from the diene (herein-after, respectively referred to simply as "α-olefin unit", "alkenyl aromatic hydrocarbon unit" and "diene unit").

The α-olefin used in the present invention includes preferably α-olefins having 3 to 20 carbon atoms, and the specific examples thereof include linear olefins such as propylene, 1-butene, 1-pentene, 1-hexene, 1-heptene, 1-octene, 1-nonene, 1-decene, 1-dodecene, 1-tetradecene, 1-hexadecene, 1-eicocene and the like, branched olefins such as 3-methyl-1-butene, 3-methyl-1-pentene, 4-methyl-1-pentene, 4-methyl-1-hexene, 5-methyl-1-hexene and the like, vinylcyclohexane, and the like. Among these, propylene, 1-butene, 1-pentene, 1-hexene, 1-heptene, 1-octene, 4-methyl-1-pentene and vinylcyclohexane are more preferable, and propylene is particularly preferable.

The alkenyl aromatic hydrocarbon used in the present invention is preferably a mono-alkenyl hydrocarbon having an aromatic hydrocarbon group having 6 to 25 carbon atoms. Specific examples of the aromatic hydrocarbon group having 6 to 25 carbon atoms include a phenyl group, a tolyl group, a xylyl group, a tert-butylphenyl group, a naphthyl group, a phenanthryl group, an anthrathenyl group, a benzyl group and the like. Preferable aromatic hydrocarbon groups are a phenyl group, a tolyl group, a xylyl group, a tert-butylphenyl group and a naphthyl group.

Specific examples of the alkenyl aromatic hydrocarbon include alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene, p-sec-butylstyrene and the like; alkenylbenzenes such as styrene, 2-phenylpropylene, 2-phenylbutene and the like; vinylnaphthalenes such as 1-vinylnaphthalene and the like, etc. The alkenyl aromatic hydrocarbon used in the present invention is preferably styrene, p-methylstyrene, m-methylstyrene, o-methylstyrene, p-tert-butylstyrene, 2-phenylpropylene, or 1-vinylnaphthalene, and styrene is preferable in particular.

The diene used in the invention is not particularly limited so far as the compound has two carbon-carbon double bonds, and for example, bis-alkenyl aromatic hydrocarbons such as, for example, divinylbenzene, divinylnaphthalene, divinylbiphenyl, diallylbenzene and the like; cyclic dienes such as norbornadiene, dicyclopentadiene, vinylnorbornene, vinylcyclohexene, 5-ethylidene-2-norbornene and the like; linear dienes such as 1,5-hexadiene, 1,7-octadiene and the like; and branched dienes such as isoprene and the like, are listed.

The copolymer of the present invention may have a vinyl group derived from the diene copolymerized in its molecular chain. When the unreacted vinyl group derived from the diene incorporated into the copolymer chain, reacts with another olefin, the vinyl group derived from the diene in the molecular chain disappears. As the result, a polymer having a branched structure in its polymer chain, is formed, and is excellent in processability. On the other hand, when the polymer has the vinyl group derived from the diene in the molecular chain, vulcanization, crosslinking, or graft polymerization can also be conducted by using the vinyl group.

As the diene, bis-alkenyl aromatic hydrocarbons, cyclic dienes and branched dienes are preferable, bis-alkenyl aromatic hydrocarbons and cyclic dienes are more preferable, and bis-alkenyl aromatic hydrocarbons are particularly preferable. When the diene is copolymerized, the molecular weight distribution tends to be broadened in accordance with the increase of molecular weight caused by crosslinking. When the tendency is remarkable, the improvement effect of mechanical strength is low, and the transparency is sometimes deteriorated. However, when a bis-alkenyl aromatic hydrocarbon is used as the diene and a specified catalyst is used, the increase of molecular weight can be promoted without remarkably broadening the molecular weight distribution of the copolymer.

As the bis-alkenyl aromatic hydrocarbon, divinylbenzene or divinylbiphenyl is preferable, and divinylbenzene is particularly preferable.

The content of the alkenyl aromatic hydrocarbon unit in the copolymer of the present invention is 1 to 99 mol %, further preferably 10 to 60 mol % and most preferably 20 to 60 mol %.

The preferable content of the diene unit in the copolymer of the present invention is preferably 0.00001 to 30 mol %. When the content of the diene unit is within the range, the copolymer is superior in mechanical strength.

The content of the diene unit in the copolymer of the present invention is more preferably 0.00001 to 20 mol %, most preferably 0.0003 to 10 mol %. The content can be determined by a $^{13}$C-NMR spectrum.

Further, in the present invention, another monomer may be copolymerized in addition to α-olefin and the alkenyl aromatic hydrocarbon, so far as the purpose of the present invention is not damaged. As the monomer, cyclic olefins and the like are listed. Specific examples of the cyclic olefin include cyclopentene, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene and the like.

The molecular weight distribution (Mw/Mn) in terms of ratio of the weight average molecular weight (Mw) to the number average molecular weight (Mn) of the copolymer of the present invention is preferably 1.5 to 12.0, more preferably 1.5 to 6.0, most preferably 1.5 to 4.0, and particularly preferably 1.7 to 2.4, from the viewpoint of the mechanical strength and transparency.

Further, the number average molecular weight (Mn) of the copolymer of the present invention is preferably 50,000 to 1,000,000, more preferably 50,000 to 500,000, and most preferably 80,000 to 400,000 from the viewpoint of the mechanical strength.

The copolymer of the present invention is preferably an amorphous copolymer having no crystallinity, from the viewpoint of transparency. It can be confirmed by no substantial indication of a melting point in a melting curve measured by a differential scanning calorimeter (DSC) that the copolymer has no crystallinity.

The α-olefin-alkenyl aromatic hydrocarbon-diene copolymer of the present invention can be produced at high polymerization activity, for example, by copolymerizing an α-olefin, an alkenyl aromatic hydrocarbon and diene in the presence of a catalyst prepared by using (A) and (B), (A) and (C), or (A), (B) and (C) described below:

(A): a transition metal complex represented by the following general formula [I], [II] or [III]:

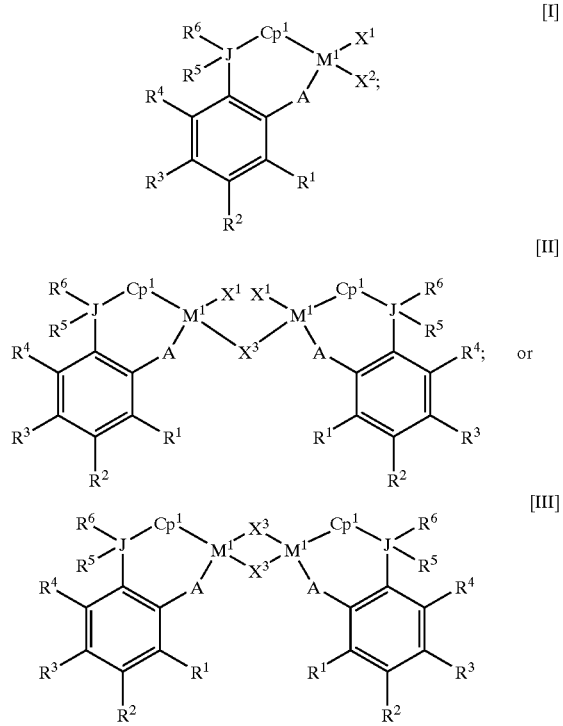

(wherein $M^1$ indicates a transition metal atom of the Group IV of the Periodic Table of the Elements, A indicates an atom of the Group XVI of the Periodic Table of the Elements; J indicates an atom of the Group XIV of the Periodic Table of the Elements, $Cp^1$ indicates a group having a cyclopentadiene type anion skeleton, each of $X^1$, $X^2$, $R^1$, $R^2$, $R^3$, $R^4$, $R^5$ and $R^6$ independently indicates a hydrogen atom, a halogen atom, an alkyl group, aralkyl group, an aryl group, a substituted silyl group, an alkoxy group, an aralkyloxy group, an aryloxy group or a di-substituted amino group, $X^3$ indicates an atom of Group XVI of the Periodic Table of the Elements, $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$, $R^1$, $R^2$, $R^3$, $R^4$, $R^5$ and $R^6$ may be respectively the same or different.), (B) one or more aluminum compounds selected from the following (B1) to (B3);

(B1) an organoaluminum compound represented by the general formula $E^1{}_aAlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_cAlE^3{}_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression 0<a ≦3; "b" represents an integer of 2 or more and "c" represents an integer of 1 or more); and (C) a boron compound of any one of the following (C1) to (C3):

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$ (wherein B represents a boron atom in the trivalent valence state; $Q^1$ to $Q^4$ may be the same or different and respectively represent a halogen atom, a hydrocarbon group, a halogenated hydrocarbon group, a substituted silyl group, an alkoxy group or a di-substituted amino group; $G^+$ represents an inorganic or organic cation; L represents a neutral Lewis base; and $(L-H)^+$ represents a Brønsted acid).

The production of the copolymer above is described in detail below.

(A) Transition metal complex

In the general formula [I], [II] or [III], the transition metal atom represented by $M^1$ means a transition metal element of Group IV of the Periodic Table of the Elements (IUPAC Inorganic Chemistry Nomenclature, Revised Edition, 1989), and examples thereof include a titanium atom, zirconium atom, hafnium atom, etc. Among them, a titanium atom or zirconium atom is preferred.

Examples of an atom of the XVI Group indicated as A in the general formula [I], [II] or [III], include an oxygen atom, sulfur atom, selenium atom and the like. Among them, an oxygen atom is preferred.

Examples of an atom of the XIV Group indicated as J in the general formula [I], [II] or [III], include a carbon atom, silicon atom, germanium atom and the like, a carbon atom and silicon atom are preferred, and a carbon atom is particularly preferred.

The group having a cyclopentadiene type anion skeleton, as for the substituent $Cp^1$, includes $\eta^5$-(substituted)cyclopentadienyl group, $\eta^5$-(substituted)indenyl group, $\eta^5$-(substituted)fluorenyl group, etc. Specific examples thereof include $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-α-olefin group, $\eta^5$-n-propylindenyl group, $\eta^5$-isopropylindenyl group, $\eta^5$-n-butylindenyl group, $\eta^5$-sec-butylindenyl group, $^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta$5-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-diphenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc. Among them, an $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group are particularly preferred.

Examples of the halogen atom in the substituent $X^1$, $X^2$, $R^1$, $R^2$, $R^3$, $R^4$, $R^5$ or $R^6$ include fluorine atom, chlorine atom, bromine atom and iodine atom, preferably chlorine atom or bromine atom, more preferably chlorine atom.

As the alkyl group in the substituent $X^1$, $X^2$, $R^1$, $R^2$, $R^3$, $R^4$, $R^5$ or $R^6$, an alkyl group having 1 to 20 carbon atoms is preferred. Examples thereof include methyl group, ethyl group, n-propyl group, isopropyl group, n-butyl group, sec-butyl group, tert-butyl group, n-pentyl group, neopentyl group, sec-amyl group, n-hexyl group, n-octyl group, n-decyl group, n-dodecyl group, n-pentadecyl group, n-eicosyl group, etc., more preferably a methyl group, ethyl group, isopropyl group, tert-butyl group or sec-amyl group.

All of these alkyl groups may be substituted with a halogen atom (fluorine atom, chlorine atom, bromine atom or iodine atom). Examples of the alkyl group having 1 to 20 carbon atoms, which is substituted with the halogen atom, include fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group, etc.

All of these alkyl groups may be partially substituted with an alkoxy group such as methoxy group, ethoxy group, etc., an aryloxy group such as phenoxy group, etc. or an aralkyloxy group such as benzyloxy group, etc.

As the aralkyl group in the substituent $X^1$, $X^2$, $R^1$, $R^2$, $R^3$, $R^4$, $R^5$ or $R^6$, an aralkyl group having 7 to 20 carbon atoms is preferred. Examples thereof include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (4,6-dimethylphenyl)methyl group, (2,3,4-timethylphenyl)methyl group, (2,3,5-timethylphenyl)methyl group, (2,3,6-timethylphenyl)methyl group, (3,4,5-timethylphenyl)methyl group, (2,4,6-timethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., more preferably a benzyl group.

All of these aralkyl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aryl group in the substituent $X^1$, $X^2$, $R^1$, $R^2$, $R^3$, $R^4$, $R^5$ or $R^6$, an aryl group having 6 to 20 carbon atoms is preferred. Examples thereof include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., more preferably phenyl group.

All of these aryl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

The substituted silyl group in the substituent $X^1$, $X^2$, $R^1$, $R^2$, $R^3$, $R^4$, $R^5$ or $R^6$ is a silyl group substituted with a hydrocarbon group, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., and an aryl group such as phenyl group.

Examples of the substituted silyl group having 1 to 20 carbon atoms include mono-substituted silyl groups having 1 to 20 carbon atoms, such as methylsilyl group, ethylsilyl group, phenylsilyl group, etc.; di-substituted silyl groups having 2 to 20 carbon atoms, such as dimethylsilyl group, diethylsilyl group, diphenylsilyl group, etc.; and tri-substituted silyl groups having 3 to 20 carbon atoms, such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., preferably trimethylsilyl group, tert-butyldimethylsilyl group or triphenylsilyl group.

All of the hydrocarbon groups of these substituted silyl groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the alkoxy group in the substituent $X^1$, $X^2$, $R^1$, $R^2$, $R^3$, $R^4$, $R^5$ or $R^6$, an alkoxy group having 1 to 20 carbon atoms is preferred. Examples thereof include methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-eicosoxy group, etc., more preferably methoxy group, ethoxy group or tert-butoxy group.

All of these alkoxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aralkyloxy group in the substituent $X^1$, $X^2$, $R^1$, $R^2$, $R^3$, $R^4$, $R^5$ or $R^6$, an aralkyloxy group having 7 to 20 carbon atoms is preferred. Examples thereof include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenyl-methoxy group, etc., more preferably benzyloxy group.

All of these aralkyloxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

As the aryloxy group in the substituent $X^1$, $X^2$, $R^1$, $R^2$, $R^3$, $R^4$, $R^5$ or $R^6$, an aralkyloxy group having 6 to 20 carbon atoms is preferred. Examples thereof include phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group, etc.

All of these aryloxy groups may be partially substituted with a halogen atom (fluorine atom, chlorine atom, bromine atom or iodine atom), an alkoxy group such as methoxy group, ethoxy group, etc., an aryloxy group such as phenoxy group, etc., or an aralkyloxy group such as benzyloxy group, etc.

The di-substituted amino group in the substituent $X^1$, $X^2$, $R^1$, $R^2$, $R^3$, $R^4$, $R^5$ or $R^6$ is an amino group substituted with two hydrocarbon groups, and examples of the hydrocarbon group include an alkyl group having 1 to 10 carbon atoms, such as methyl group, ethyl group, n-propyl group, isopropyl group, n-butyl group, sec-butyl group, tert-butyl group, isobutyl group, n-pentyl group, n-hexyl group, cyclohexyl group, etc., an aryl group having 6 to 10 carbon atoms, such as phenyl group, etc., and an aralkyl group having 7 to 10 carbon atoms. Examples of the di-substituted amino group substituted with the hydrocarbon group having 1 to 10 carbon atoms include dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., preferably dimethylamino group or diethylamino group.

The substituent $R^1$, $R^2$, $R^3$, $R^4$, $R^5$ and $R^6$ may be optionally combined with each other to form a ring.

$R^1$ is preferably an alkyl group, an aralkyl group, an aryl group or a substituted silyl group.

Preferably, each of $X^1$ and $X^2$ is independently a halogen atom, an alkyl group, an aralkyl group, an alkoxy group, an aryloxy group or a di-substituted amino group, more preferably halogen atom.

Examples of the atom of Group XVI of the Periodic Table of the Elements indicated as $X^3$ in the general formula [II] or [III] include an oxygen atom, a sulfur atom, a selenium atom and the like, and an oxygen atom is preferable.

Examples of the transition metal complex (A) represented by the formula [I] (hereinafter referred to as a "transition metal complex A", sometimes) include transition metal complexes wherein J is a carbon atom in the general formula [I], such as methylene(cyclopentadienyl)(3,5-dimethyl-2-phenoxy)titanium dichloride, methylene(cyclopentadienyl)(3-tert-butyl-2 -phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy) titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl) (3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene( fluorenyl)(3-tert-butyl-5-methyl-2-phenoxy)titanium dichloride, methylene( fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3 -tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene (fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene (fluorenyl)(3-tert-butyldimethylsilyl-5-methyl-2-phenoxy) titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene (cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy) titanium dichloride, diphenylmethylene(cyclopentadienyl) (3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene (methylcyclopentadienyl )(3,5-dimethyl-2-phenoxy) titanium dichloride, diphenylmethylene (methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene (methylcyclopentadienyl)(3-tert-butyldimethylsilyl-5-methyl-2-phenoxy)titanium dichloride, diphenylmethylene (methylcyclopentadienyl) (3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl) (3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy) titanium dichloride, diphenylmethylene(tert-butylcyclopentadienyl)(3-tert-butyl-5-chloro-2-phenoxy) titanium dichloride, diphenylmethylene (tetramethylcyclopentadienyl)(3,5-dimethyl-2-phenoxy) titanium dichloride, diphenylmethylene (tetramethylcyclopentadienyl)(3-tert-butyl-2-phenoxy) titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy) titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium dichloride, diphenylmethylene (tetramethylcyclopentadienyl)(3-tert-butyl-5-chloro-2-phenoxy)titanium dichloride, diphenylmethylene (trimethylsilylcyclopentadienyl)(3,5-dimethyl-2-phenoxy) titanium dichloride, diphenylmethylene (trimethylsilylcyclopentadienyl)(3-tert-butyl-2-phenoxy) titanium dichloride, diphenylmethylene (trimethylsilylcyclopentadienyl)(3-tert-butyl-5-methyl-2-phenoxy)titanium dichloride, diphenylmethylene (trimethylsilylcyclopentadienyl)(3-phenyl-2-phenoxy) titanium dichloride, diphenylmethylene (trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy) titanium dichloride, diphenylmethylene(fluorenyl)(3-tert-butyl-2-phenoxy)titanium dichloride, diphenylmethylene (fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl) (3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2 -phenoxy)titanium dichloride, diphenylmethylene (fluorenyl)(3-tert-butyl-5-chloro-2-phenoxy) titanium dichloride, compounds wherein titanium of these compounds is replaced by zirconium or hafnium, compounds wherein dichloride of these compounds is replaced by dibromide, diiodide, bis(dimethylamide), bis(diethylamide), di-n-butoxide or diisopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) or (indenyl), and compounds wherein (3,5-dimethyl-2-phenoxy) of these compounds is replaced by (2-phenoxy), (3-methyl-2-phenoxy), (3,5-di-tert-butyl-2-phenoxy), (3-phenyl-5-methyl-2-phenoxy), (3-tert-butyldimethylsilyl-2-phenoxy) or (3-trimethylsilyl-2-phenoxy); and transition metal complex wherein J is an atom of Group XIV of the Periodic Table of the Elements other than carbon atom, such as dimethylsilylene (cyclopentadienyl)(2-phenoxy)titanium dichloride, dimethylsilylene(cyclopentadienyl)(3-methyl-2-phenoxy) titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy) titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene (cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium. dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene (cyclopentadienyl)(3-tert-butyl-5-chloro-2-phenoxy) titanium dichloride, dimethylsilylene(cyclopentadienyl)(3,5-di-sec-amyl-2-phenoxy)titanium dichloride, dimethylsilylene(methylcyclopentadienyl)(2-phenoxy) titanium dichloride, dimethylsilylene (methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene (methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene (methylcyclopentadienyl)(5-methyl-3-phenyl-2-phenoxy) titanium dichloride, dimethylsilylene (methylcyclopentadienyl)(3 -tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene (methylcyclopentadienyl)(3-tert-butyl-5-methoxy-2-phenoxy)titanium dichloride, dimethylsilylene (methylcyclopentadienyl)(3-tert-butyl-5-chloro-2-phenoxy) titanium dichloride, dimethylsilylene (methylcyclopentadienyl)(3,5-di-sec-amyl-2-phenoxy) titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene (n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy) titanium dichloride, dimethylsilylene(n-butylcyclopentadienyl)(5-methyl-3-phenyl-2-phenoxy) titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-di-sec-amyl-2-phenoxy) titanium dichloride, dimethylsilylene(tert-butylcyclopentadienyl)-2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene (tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy) titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-di-sec-amyl-2-phenoxy) titanium dichloride, dimethylsilylene (tetramethylcyclopentadienyl)(2-phenoxy)titanium dichloride, dimethylsilylene(tetramethylcyclopentadienyl) (3-methyl-2-phenoxy)titanium dichloride, dimethylsilylene (tetramethylcyclopentadienyl)(3,5-dimethyl-2-phenoxy) titanium dichloride, dimethylsilylene (tetramethylcyclopentadienyl)(3-tert-butyl-2-phenoxy) titanium dichloride, dimethylsilylene (tetramethylcyclopentadienyl)(3-tert-butyl-5-methyl-2-phenoxy)titanium dichloride, dimethylsilylene (tetramethylcyclopentadienyl)(3,5-di-tert-butyl-2-phenoxy) titanium dichloride, dimethylsilylene (tetramethylcyclopentadienyl)(5-methyl-3-phenyl-2-phenoxy)titanium dichloride, dimethylsilylene (tetramethylcyclopentadienyl)(3-tert-butyldimethylsilyl-5-methyl-2-phenoxy)titanium dichloride, dimethylsilylene (tetramethylcyclopentadienyl)(5-methyl-3-trimethylsilyl-2-phenoxy)titanium dichloride, dimethylsilylene (tetramethylcyclopentadienyl)(3-tert-butyl-5-methoxy-2-phenoxy)titanium dichloride, dimethylsilylene (tetramethylcyclopentadienyl)(3-tert-butyl-5-chloro-2-phenoxy)titanium dichloride, dimethylsilylene (tetramethylcyclopentadienyl)(3,5-di-sec-amyl-2-phenoxy) titanium dichloride, dimethylsilylene (trimethylsilylcyclopentadienyl)(2-phenoxy)titanium dichloride, dimethylsilylene (trimethylsilylcyclopentadienyl)(3 -methyl-2-phenoxy) titanium dichloride, dimethylsilylene (trimethylsilylcyclopentadienyl)(3,5-dimethyl-2-phenoxy) titanium dichloride, dimethylsilylene (trimethylsilylcyclopentadienyl)(3-tert-butyl-2-phenoxy) titanium dichloride, dimethylsilylene (trimethylsilylcyclopentadienyl)(3-tert-butyl-5-methyl-2-phenoxy)titanium dichloride, dimethylsilylene (trimethylsilylcyclopentadienyl)(3,5-di-tert-butyl-2-phenoxy)titanium dichloride, dimethylsilylene (trimethylsilylcyclopentadienyl)(5-methyl-3-phenyl-2- phenoxy)titanium dichloride, dimethylsilylene (trimethylsilylcyclopentadienyl)(3-tert-butyldimethylsilyl-5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-butyl-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-di-sec-amyl-2-phenoxy)titanium dichloride, dimethylsilylene(indenyl) (2-phenoxy)titanium dichloride, dimethylsilylene(indenyl) (3-methyl-2-phenoxy)titanium dichloride, dimethylsilylene (indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl) (3,5-di-tert-butyl-2-phenoxy)titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-di-sec-amyl-2-phenoxy) titanium dichloride, dimethylsilylene(fluorenyl)(2-phenoxy) titanium dichloride, dimethylsilylene(fluorenyl)(3-methyl-2-phenoxy)titanium dichloride, dimethylsilylene(fluorenyl) (3,5-dimethyl-2-phenoxy)titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy)titanium dichloride, dimethylsilylene (fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-di-sec-amyl-2-phenoxy) titanium dichloride, and dimethylsilylene (tetramethylcyclopentadienyl)(1-naphthox-2-yl)titanium dichloride; compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) or (phenylindenyl); compounds wherein (2-phenoxy) of these compounds is replaced by (3-phenyl-2-phenoxy), (3-trimethylsilyl-2-phenoxy) or (3-tert-butyldimethylsilyl-2-phenoxy); compounds wherein dimethylsilylene of these compounds is replaced by diethylsilylene, diphenylsilylene or dimethoxysilylene, compounds wherein titanium of these compounds is replaced by zirconium or hafnium; and compounds wherein dichloride of these compounds is replaced by dibromide, diiodide, bis(dimethylamide), bis (diethylamide), di-n-butoxide or diisopropoxide.

Examples of such transition metal compound [II] include $\mu$-oxobis{isopropylidene($\eta^5$-cyclopentadienyl)(2-phenoxy) titanium chloride}, $\mu$-oxobis{isopropylidene($\eta^5$-cyclopentadienyl)(2-phenoxy)titanium methoxide}, $\mu$-oxobis{isopropylidene($\eta^5$-cyclopentadienyl)(3-tert-butyl-5-methyl-2-phenoxy)titanium chloride}, $\mu$-oxobis{isopropylidene($\eta^5$-cyclopentadienyl)(3-tert-butyl-5-methyl-2-phenoxy)titanium methoxide}, $\mu$-oxobis{isopropylidene($\eta^5$-methylcyclopentadienyl)(2-phenoxy)titanium chloride}, $\mu$-oxobis{isopropylidene($\eta^5$-methylcyclopentadienyl)(2-phenoxy)titanium methoxide}, $\mu$-oxobis{isopropylidene($\eta^5$-methylcyclopentadienyl)(3-tert-butyl-5-methyl-2-phenoxy)titanium chloride}, $\mu$-oxobis{isopropylidene($\eta^5$-methylcyclopentadienyl)(3-tert-butyl-5-methyl-2-phenoxy)titanium methoxide}, $\mu$-oxobis{isopropylidene($\eta^5$-tetramethylcyclopentadienyl) (2-phenoxy)titanium chloride}, $\mu$-oxobis{isopropylidene ($\eta^5$-tetramethylcyclopentadienyl)(2-phenoxy)titanium methoxide}, $\mu$-oxobis{isopropylidene($\eta^5$-tetramethylcyclopentadienyl)(3-tert-butyl-5-methyl-2-phenoxy)titanium chloride}, $\mu$-oxobis{isopropylidene($\eta^5$-tetramethylcyclopentadienyl)(3-tert-butyl-5-methyl-2-phenoxy)titanium methoxide}, $\mu$-oxobis{dimethylsilylene ($\eta^5$-cyclopentadienyl)(2-phenoxy)titanium chloride}, $\mu$-oxobis{dimethylsilylene($\eta^5$-cyclopentadienyl)(2-phenoxy)titanium methoxide}, $\mu$-oxobis{dimethylsilylene ($\eta^5$-cyclopentadienyl)(3-tert-butyl-5-methyl-2-phenoxy) titanium chloride}, $\mu$-oxobis{dimethylsilylene($\eta^5$-cyclopentadienyl)(3-tert-butyl-5-methyl-2-phenoxy) titanium methoxide}, $\mu$-oxobis{dimethylsilylene($\eta^5$-methylcyclopentadienyl)(2-phenoxy)titanium chloride}, $\mu$-oxobis{dimethylsilylene($\eta^5$-methylcyclopentadienyl)(2-phenoxy)titanium methoxide}, $\mu$-oxobis{dimethylsilylene ($\eta^5$-methylcyclopentadienyl)(3-tert-butyl-5-methyl-2-phenoxy)titanium chloride}, $\mu$-oxobis{dimethylsilylene($\eta^5$-methylcyclopentadienyl)(3-tert-butyl-5-methyl-2-phenoxy) titanium methoxide}, $\mu$-oxobis{dimethylsilylene($\eta^5$-tetramethylcyclopentadienyl)(2-phenoxy)titanium chloride}, $\mu$-oxobis{dimethylsilylene($\eta^5$-tetramethylcyclopentadienyl)(2-phenoxy)titanium methoxide}, $\mu$-oxobis{dimethylsilylene($\eta^5$-tetramethylcyclopentadienyl)(3-tert-butyl-5-methyl-2-phenoxy)titanium chloride}, $\mu$-oxobis{dimethylsilylene($\eta^5$-tetramethylcyclopentadienyl)(3-tert-butyl-5-methyl-2-phenoxy)titanium methoxide} and the like.

Examples of such transition metal compound [III] include di-$\mu$-oxobis{isopropylidene($\eta^5$-cyclopentadienyl)(2-phenoxy)titanium}, di-$\mu$-oxobis{isopropylidene($\eta^5$-cyclopentadienyl)(3-tert-butyl-5-methyl-2-phenoxy) titanium}, di-$\mu$-oxobis{isopropylidene($\eta^5$-methylcyclopentadienyl)(2-phenoxy)titanium}, di-$\mu$-oxobis{isopropylidene($\eta^5$-methylcyclopentadienyl)(3-tert-butyl-5-methyl-2-phenoxy)titanium}, di-$\mu$-oxobis{isopropylidene($\eta^5$-tetramethylcyclopentadienyl)(2-phenoxy)titanium}, di-$\mu$-oxobis{isopropylidene($\eta^5$-tetramethylcyclopentadienyl)(3-tert-butyl-5-methyl-2-phenoxy)titanium}, di-$\mu$-oxobis{dimethylsilylene($\eta^5$-cyclopentadienyl)(2-phenoxy)titanium}, di-$\mu$-oxobis{dimethylsilylene($\eta^5$-cyclopentadienyl)(3-tert-butyl-5-methyl-2-phenoxy)titanium}, di-$\mu$-oxobis{dimethylsilylene($\eta^5$-methylcyclopentadienyl)(2-phenoxy)titanium}, di-$\mu$-oxobis{dimethylsilylene($\eta^5$-methylcyclopentadienyl)(3-tert-butyl-5-methyl-2-phenoxy) titanium}, di-$\mu$-oxobis{dimethylsilylene($\eta^5$-tetramethylcyclopentadienyl)(2-phenoxy)titanium}, di-$\mu$-oxobis{dimethylsilylene($\eta^5$-tetramethylcyclopentadienyl) (3-tert-butyl-5-methyl-2-phenoxy)titanium} and the like.

The transition metal complex represented by the above general formula [I] can be synthesized, for example, by a method disclosed in WO 97/03992.

The transition metal compound represented by the general formula [II] or [III] can be produced, for example, by reacting a transition metal compound represented by the general formula [I] with 0.5-fold by mole or 1-fold by mole of water. Wherein a method of directly reacting a transition metal compound with a required amount of water, a method of charging a transition metal compound in a solvent such as a hydrocarbon containing a required amount of water, or the like, a method of charging a transition metal compound represented by the general formula [I] in a solvent such as a dry hydrocarbon or the like and further flowing an inert gas containing a required amount of water, or the like, etc. can be adopted.

(B) Aluminum Compound

The aluminum compound (B) used in the present invention includes publicly known organoaluminum compounds, that is, at least one aluminum compound selected from (B1) to (B3) described below:

(B1) an organoaluminum compound represented by the general formula $E^1_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3_2$ (wherein $E^1$, $E^2$ and $E^3$ respectively represent a hydrocarbon group, all of $E^1$, all of $E^2$ and all of $E^3$ may be the same or different; Z represents a hydrogen atom or a halogen atom, and all of Z may be the same or different; "a" represents a number satisfying the expression $0<a \leq 3$; "b" represents an integer of 2 or more and "c" represents an integer of 1 or more).

As the hydrocarbon group in $E^1$, $E^2$ or $E^3$, a hydrocarbon group having 1 to 8 carbon atoms is preferred and an alkyl group is more preferred.

Specific examples of the organoaluminum compound (B1) represented by $E^1_a AlZ_{3-a}$ include trialkylaluminums such as trimethylaluminum, triethylaluminum, tri-n-propylaluminum, triisopropylaluminum, triisobutylaluminum, tri-n-hexylaluminum, etc.; dialkylaluminum chlorides such as dimethylaluminum chloride, diethylaluminum chloride, di-n-propylaluminum chloride, diisopropylaluminum chloride, diisobutylaluminum chloride, di-n-hexylaluminum chloride, etc.; alkylaluminum dichlorides such as methylaluminum dichloride, ethylaluminum dichloride, n-propylaluminum dichloride, isopropylaluminum dichloride, isobutylaluminum dichloride, n-hexylaluminum dichloride, etc.; and dialkylaluminum hydrides such as dimethylaluminum hydride, diethylaluminum hydride, di-n-propylaluminum hydride, diisobutylaluminum hydride, di-n-hexylaluminum hydride, etc.

Among them, trialkylaluminum is preferred and triethylaluminum or triisobutylaluminum is more preferred. Specific examples of $E^2$ and $E^3$ in (B2) a cyclic aluminoxane having a structure represented by the general formula $\{-Al(E^2)-O-\}_b$ and (B3) a linear aluminoxane having a structure represented by the general formula $E^3\{-Al(E^3)-O-\}_c AlE^3_2$ include alkyl groups such as methyl group, ethyl group, n-propyl group, isopropyl group, n-butyl group, isobutyl group, n-pentyl group, neopentyl group, etc. "b" is an integer of 2 or more, "c" is an integer of 1 or more. Each of $E^2$ and $E^3$ is preferably a methyl group or isobutyl group. "b" is preferably from 2 to 40 and c is preferably from 1 to 40.

The above aluminoxane is prepared by various methods. The method is not specifically limited, and the aluminoxane may be prepared according to a publicly known method. For example, the aluminoxane can be prepared by contacting a solution obtained by dissolving a trialkylaluminum (e.g. trimethylaluminum) in a suitable organic solvent (e.g. benzene, aliphatic hydrocarbon) with water. Also, there can be illustrated a method for preparing the aluminoxane by contacting a trialkylaluminum (e.g. trimethylaluminum, etc.) with a metal salt containing crystal water (e.g. copper sulfate hydrate, etc.).

(C) Boron compound

As the boron compound (C) in the present invention, there can be used any one of (C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3Q^4)^-$.

In the boron compound (C1) represented by the general formula $BQ^1Q^2Q^3$, B represents a boron atom in the trivalent valence state; $Q^1$ to $Q^3$ may be the same or different and represent a halogen atom, a hydrocarbon group, a halogenated hydrocarbon group, a substituted silyl group, an alkoxy group or a di-substituted amino group. Each of $Q^1$ to $Q^3$ is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms, more preferably a hydrocarbon group having 1 to 20 carbon atoms or a halogenated hydrocarbon group having 1 to 20 carbon atoms. More preferably, $Q^1$ to $Q^3$ are a fluorinated hydrocarbon group having 1 to 20 carbon atoms and containing at least one fluorine atom, and most preferably, $Q^1$ to $Q^3$ are a fluorinated aryl group having 6 to 20 carbon atoms and containing at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris( 3,4,5-trifluorophenyl)borane, tris(2,3,4-trifluorophenyl)borane, phenylbis (pentafluorophenyl)borane, etc., most preferably tris(pentafluorophenyl)borane.

In the boron compound (C2) represented by the general formula $G^+(BQ^1Q^2Q^3Q^4)^-$, $G^+$ represents an inorganic or organic cation; B represents a boron atom in the trivalent valence state; and $Q^1$ to $Q^4$ are the same as defined above for in $Q^1$ to $Q^3$ in (C1).

Specific examples of $G^+$ as an inorganic cation in the compound represented by the general formula $G^+(BQ^1Q^2Q^3Q^4)^-$ include a ferrocenium cation, alkyl-substituted ferrocenium cation, silver cation, etc. Examples of the $G^+$ as an organic cation include a triphenylmethyl cation. $G^+$ is preferably a carbenium cation, particularly a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluoromethylphenyl)borate, etc.

Specific combinations of them include ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis(pentafluorophenyl)borate, triphenylmethyltetrakis(3,5-bistrifluoromethylphenyl)borate, etc., most preferably triphenylmethyltetrakis(pentafluorophenyl)borate.

In the boron compound (C3) represented by the formula $(L-H)^+(BQ^1Q^2Q^3Q^4)^-$, L represents a neutral Lewis base; $(L-H)^+$ represents a Brønsted acid; B represents a boron atom in the trivalent valence state; and $Q^1$ to $Q^4$ are the same as defined above for $Q^1$ to $Q^3$ in (C1).

Specific examples of $(L-H)^+$ as a Brønsted acid in the compound represented by the formula $(L-H)^+$ $(BQ^1Q^2Q^3Q^4)^-$ include trialkyl-substituted ammoniums, N,N-dialkylaniliniums, dialkylammoniums, triarylphosphoniums, etc., and examples of $(BQ^1Q^2Q^3Q^4)^-$ include those as defined above.

Specific combinations of them include triethylammoniumtetrakis(pentafluorophenyl)borate, tripropylammoniumtetrakis(pentafluorophenyl)borate, tri(n-butyl)ammoniumtetrakis(pentafluorophenyl)borate, tri(n-butyl)ammoniumtetrakis(3,5-bistrifluoromethylphenyl) borate, N,N-dimethylaniliniumtetrakis(pentafluorophenyl) borate, N,N-diethylaniliniumtetrakis(pentafluorophenyl) borate, N,N-2,4,6-pentamethylaniliniumtetrakis (pentafluorophenyl)borate, N,N-dimethylaniliniumtetrakis (3,5-bistrifluoromethylphenyl)borate, diisopropylammoniumtetrakis(pentafluorophenyl)borate, dicyclohexylammoniumtetrakis(pentafluorophenyl)borate, triphenylphosphoniumtetrakis(pentafluorophenyl)borate, tri (methylphenyl)phosphoniumtetrakis(pentafluorophenyl) borate, tri(dimethylphenyl)phosphoniumtetrakis (pentafluorophenyl)borate, etc., most preferably tri(n-butyl) ammoniumtetrakis(pentafluorophenyl)borate or N,N-dimethylanilinumtetrakis(pentafluorophenyl)borate.

[Polymerization]

In the present invention, a catalyst for olefin polymerization prepared by contacting a compound (A) with a compound (B) and/or a compound (C) is used. In case of using a catalyst for olefin polymerization prepared by contacting the component (A) with the component(B), the above cyclic aluminoxane (B2) and/or linear aluminoxane (B3) are preferable as the component(B). Another preferable embodiment of the catalyst for olefin polymerization includes a catalyst for olefin polymerization prepared by contacting the above (A), (B) and (C), together. As the component (B), the above (B1) is easily used.

The respective components are desirably used so that a molar ratio of (B)/(A) is usually within the range from 0.1 to 10000, preferably 5 to 2000 and a molar ratio of (C)/(A) is usually within the range from 0.01 to 100, preferably 0.5 to 10.

When the respective components are used in the state of a solution or state suspended in a solvent, the concentration of the respective components is appropriately selected according to the conditions such as ability of an apparatus for feeding the respective components in a polymerization reactor. The respective components are desirably used so that the concentration of (A) is usually from 0.01 to 500 $\mu$mol/g, preferably from 0.05 to 100 $\mu$mol/g, more preferably from 0.05 to 50 $\mu$mol/g; the concentration of (B) is usually from 0.01 to 10000 $\mu$mol/g, preferably from 0.1 to 5000 $\mu$mol/g, more preferably from 0.1 to 2000 $\mu$L mol/g, in terms of Al atom; and the concentration of (C) is usually from 0.01 to 500 $\mu$mol/g, preferably from 0.05 to 200 $\mu$mol/g, more preferably from 0.05 to 100 $\mu$mol/g.

As the catalyst used in the present invention, a particle-like carrier including an inorganic carrier such as $SiO_2$, $Al_2O_3$ or the like, or an organic polymer carrier such as a polymer of $\alpha$-olefin, styrene or the like, may be further used in combination.

The process for producing the $\alpha$-olefin-alkenyl aromatic compound-diene copolymer of the present invention is not specifically limited, and there can be used any polymerization process such as a batch-wise or continuous gas phase polymerization, bulk polymerization, solution polymerization using an appropriate solvent or slurry polymerization process, or the like. When a solvent is used, various solvents can be used so far as the solvent does not de-activate the catalyst. The specific examples thereof include hydrocarbons such as benzene, toluene, pentane, hexane, heptane, cyclohexane and halogenated hydrocarbons such as dichloromethane, ethylene dichloride.

The polymerization temperature is not particularly limited, and the polymerization is carried out usually −100 to 250° C., preferably −50 to 200° C. And, the polymerization pressure is not particularly limited, and the polymerization is carried out usually under a pressure of 10 MPa or less, preferably 0.2 to 5 MPa. Further, a chain transfer agent such hydrogen can be added to control a molecular weight of a polymer to be obtained. Further, the copolymer of the present invention can be used for molded articles such as a film, sheet, container or the like, and particularly, it is suitable for a film or sheet. The film or sheet can be obtained by an inflation molding in which a molten copolymer of the present invention is extruded from a circular die and then a film inflated in tubular shape is wound up, by a T-die film molding in which a molten copolymer of the present invention is extruded from a linear T-die and the extruded film is wound up or by a calendering, or the like.

The molded article of the invention is transparent and excellent in flexibility and elasticity recoverability. The flexibility and elasticity recoverability of the molded article can be investigated by obtaining the hysterysis curve in tensile test.

Further, a multi-layer article composed of the film or sheet with one or more of other raw materials can be produced by a known lamination process such as a co-extrusion process, a dry-lamination process, a sandwich-lamination process, an extrusion-lamination process or the like. As the other raw materials, there are illustrated known raw materials such as a paper, a paperboard, an aluminum foil, a cellophane, a Nylon, polyethylene terephthalate(PET), polypropylene, polyvinylidene chloride, a saponified product of $\alpha$-olefin-vinyl acetate copolymer(EVOH), various kinds of adhesive resins, and the like.

The molded articles of the present invention include those obtained by a blow molding or injection molding.

The molded articles of the present invention may optionally contain known additives such as antioxidants, weather resistant agents, lubricants, anti-blocking agents, anti-static agents, anti-fogging agents, anti-dropping agents, pigments, fillers and the like. Further, known polymer substances such as low density polyethylene obtained by a radical polymerization process, high density polyethylene, linear low density polyethylene, an ethylene-$\alpha$-olefin copolymer elastomer, polypropylene and the like may be blended.

The film or sheet of the present invention can be subjected to a known post-treatment such as a corona discharge treatment, a plasma treatment, an ozone treatment, an ultraviolet rays irradiation, an electron beam irradiation or the like.

EXAMPLES

The present invention is illustrated in accordance with Examples, but the present invention is not limited thereto.

Further, properties of the copolymer were measured by methods described below.

(1) Glass transition point and melting point were measured under conditions below using a differential scanning calorie meter, SSC-5200 equipment manufacture by Seiko Electronics Co., Ltd., and determined by its inflection point.

Heating: 20° C. to 200° C. (20° C./min.), retention for 10 min.

Cooling: 200° C. to −50° C. (20° C./min.), retention for 10 min.

Measurement: −50° C. to 300° C. (20° C./min.)

(2) The molecular weight and molecular weight distribution were determined under conditions below using a Gel Permeation Chromatograph (800 series manufacture by Nippon Bunko Co., Ltd.).

Column: Shodex A806M

Measurement temperature: 45° C.,

Measurement solvent: tetrahydrofuran

Measurement concentration ; 0.5 mg/ml (3) The content of styrene units in a polymer and the structure of the polymer were determined according to $^{13}$C-NMR analysis (JNM-EX270 manufactured by JEOL LTD.).

Measurement solvent: a mixed liquid of o-dichlorobenzene and deuterated benzene at a weight ratio of 85:15

Measurement temperature: 135° C.

(4) The refractive index of a polymer was determined with an Abbe refractometer type 3 (manufactured by Atago Co., Ltd.) by measuring a test piece which was obtained by cutting into a size of 10 mm×30 mm a film of 100 μm thickness molded by carrying out hot-press at 180° C. for 3 minutes under a pressure of 3 to 5 MPa after pre-heating at 180° C. for 3 minutes.

Example 1

In a 400 mL autoclave which had been replaced with argon, 55 ml of styrene, 1.25 ml of a toluene solution (0.1 mol/l) of divinylbenzene (p-divinylbenzene manufactured by Nissei Chemical Co. Ltd.) and 19 ml of dry toluene were previously charged, and then propylene was fed at a pressure of 0.8 MPa. After previously mixing a solution in which 6.0 mg of isopropylidene(cyclopentadienyl)(3-tert-butyl-5-methyl-2-phenoxy)titanium dichloride shown below was dissolved in 8 ml of dry toluene and 4.0 ml of a toluene solution of triisobutylaluminum (manufactured by Toso-Akzo Co. Ltd., 1 mol/l), the mixture was charged, successively a solution in which 44.3 mg of triphenylmethyltetrakis (pentafluorophenyl)borate was dissolved in 9.6 ml of dry toluene was charged, and the reaction solution was stirred at 60° C. for 1 hour. Then, the reaction solution was charged in a mixture of 5 ml of hydrogen chloride (12N) and 1000 ml of acetone, and a white solid precipitated was obtained by filtration. The solid was washed with acetone, and then dried under vacuum to obtain 6.88 g of a polymer.

The polymer had a Mn of 82,000, and a Mw/Mn of 1.97. A glass transition point was 33° C. and a melting point could not be substantially confirmed. Further, the refractive index of the film of said polymer was 1.522. Further, a press sheet prepared for measurement had a very high transparency.

When the polymer sheet was elongated by pulling with hands and then set free, the sheet was recovered generally and slowly to the original length, and the sheet was flexible.

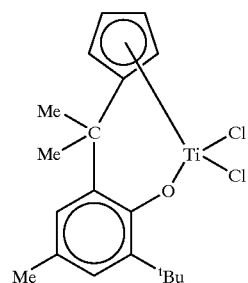

As described above, according to the present invention, a copolymer being capable of taking a constitution in which a halogen is not contained and excellent in elastic recoverability and flexibility, a process for producing said copolymer at a high polymerization activity, and a molded article comprising said copolymer, and its utility value is markedly large.

What is claimed is:

1. A copolymer consisting of repeating units derived from an α-olefin having 3 to 20 carbon atoms, repeating units derived from a mono-alkenyl hydrocarbon containing an aromatic hydrocarbon having 6 to 25 carbon atoms and repeating units derived from a diene selected from the group consisting of bis-alkenyl aromatic hydrocarbons, cyclic dienes and branched dienes and having no crystallinity, wherein the contents of the mono-alkenyl hydrocarbon unit and the diene unit determined by a $^{13}$C-NMR spectrum are 1 to 99 mol % and 0.00001 to 30 mol %, respectively, the number average molecular weight of the copolymer is 50,000 to 1,000,000, and the weight average molecular weight to the number average molecular weight of the copolymer is 1.5 to 6.0.

2. A process for producing the copolymer of claim 1, which comprises copolymerizing (i) an α-olefin having 3 to 20 carbon atoms, (ii) a mono-alkenyl hydrocarbon containing an aromatic hydrocarbon group having 6 to 25 carbon atoms and (iii) a diene, in the presence of a catalyst prepared by using (A) and (B), (A) and (C), or (A), (B) and (C), as described below:

(A): a transition metal complex represented by the following general formula [I], [II] or [III]:

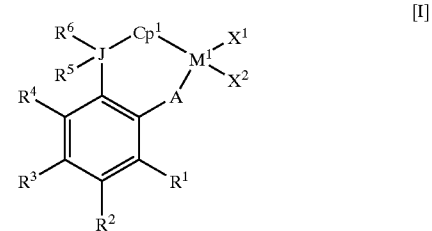

[I]

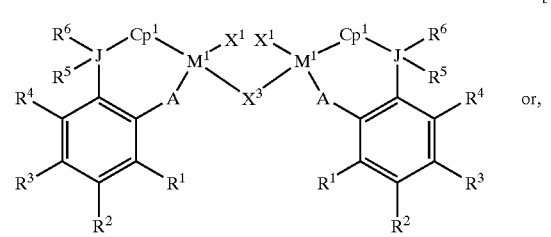

[II]

or,

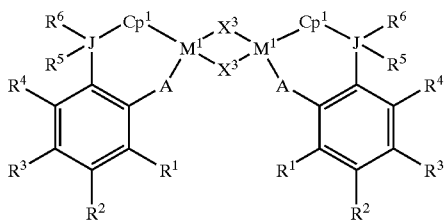

wherein $M^1$ indicates a transition metal atom of the Group IV of the Periodic Table of the Elements, A indicates an atom of the Group XVI of the Periodic Table of the Elements, J indicates an atom of the Group XIV of the Periodic Table of the Elements, $Cp^1$ indicates a group having a cyclopentadiene type anion skeleton, each of $X^1$, $X^2$, $R^1$, $R^2$, $R^3$, $R^4$, $R^5$ and $R^6$ independently indicates a hydrogen atom, a halogen atom, an alkyl group, aralkyl group, an aryl group, a substituted silyl group, an alkoxy group, an aralkyloxy group, an aryloxy group or a di-substituted amino group, $X^3$ indicates an atom of Group XVI of the Periodic Table of the Elements, $R^1$, $R^2$, $R^3$, $R^4$, $R^5$ and $R^6$ may be optionally combined with each other to form a ring; and in the general formula [II] or [III], two of $M^1$, A, J, $Cp^1$, $X^1$, $X^2$, $X^3$ $R^1$, $R^2$, $R^3$, $R^4$, $R^5$ and $R^6$ may be respectively the same or different;

(B) one or more aluminum compounds selected from the following (B1) to (B3);

(B1) an organoaluminum compound represented by the general formula $E^1_a AlZ_{3-a}$, (B2) a cyclic aluminoxane having a structure represented by the general formula $\{-Al(E^2)-O-\}_b$, and (B3) a linear aluminoxane having a structure represented by the general formula $E^3\{-Al(E^3)-O-\}_c AlE^3_2$, wherein $E^1$, $E^2$ and $E^3$ respectively represent a hydrocarbon group, all of $E^1$, all of $E^2$ and all of $E^3$ may be the same or different, Z represents a hydrogen atom or a halogen atom, and all of Z may be the same or different, "a" represents a number satisfying the expression $0 < a \leq 3$, "b" represents an integer of 2 or more and "c" represents an integer of 1 or more; and (C) a boron compound of any one of the following (C1) to (C3):

(C1) a boron compound represented by the general formula $BQ^1Q^2Q^3$, (C2) a boron compound represented by the general formula $G^+(BQ^1Q^2Q^3Q^4)^-$, and (C3) a boron compound represented by the general formula $(L-H)^+(BQ^1Q^2Q^3Q^4)^-$, wherein B represents a boron atom in the trivalent valence state, $Q^1$ to $Q^4$ may be the same or different and respectively represent a halogen atom, a hydrocarbon group, a halogenated hydrocarbon group, a substituted silyl group, an alkoxy group or a di-substituted amino group, $G^+$ represents an inorganic or organic cation, L represents a neutral Lewis base, and $(L-H)^+$ represents a Bronsted acid.

3. A molded article comprising the copolymer of claim 1.

4. The molded article according to claim 3, wherein the molded article is a sheet or film.

5. The copolymer according to claim 1, wherein a content of the mono-alkenyl hydrocarbon unit and the diene unit are 10 to 60 mol % and 0.0001 to 20 mol %, respectively.

6. The copolymer according to claim 1, wherein a content of the mono-alkenyl hydrocarbon unit and the diene unit are 20 to 60 mol % and 0.0003 to 10 mol %, respectively.

7. The copolymer according to claim 1, wherein the α-olefin is a monomer selected from the group consisting of propylene, 1-butene, 1-pentene, 1-hexene, 1-heptene, 1-octene, 4-methyl-1-pentene and vinylcyclohexane; the mono-alkenyl hydrocarbon is styrene; and the diene is a bis-alkenyl aromatic hydrocarbon.

8. A copolymer consisting of units derived from propylene, units derived from styrene and units derived from divinylbenzene and having no crystallinity, wherein the styrene unit content is 10 to 60 mol %, the divinylbenzene unit content is 0.0003 to 10 mol %, the number average molecular weight of the copolymer is 50,000 to 1,000,000 and the weight average molecular weight to the number average molecular weight of the copolymer is 1.5 to 6.0.

* * * * *